No. 647,276. Patented Apr. 10, 1900.
G. C. PYLE.
MACHINE FOR MAKING HOLLOW GLASSWARE.
(Application filed Feb. 25, 1899.)

(No Model.) 6 Sheets—Sheet 1.

Witnesses
R. D. Hawkins
M. C. Buck.

Inventor
George C. Pyle
By V. H. Lockwood
His Attorney.

THE NORRIS PETERS CO., PHOTO-LITHO., WASHINGTON, D. C.

No. 647,276. Patented Apr. 10, 1900.
G. C. PYLE.
MACHINE FOR MAKING HOLLOW GLASSWARE.
(Application filed Feb. 25, 1899.)
(No Model.) 6 Sheets—Sheet 2.
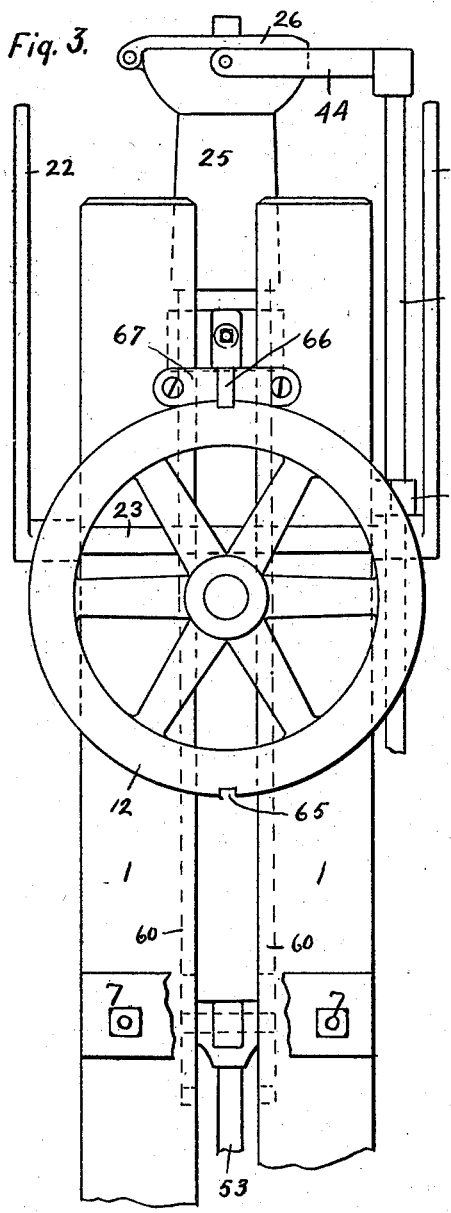
Witnesses
R. D. Hawkins
M. C. Buck
Inventor
George C. Pyle
By V. H. Lockwood
His Attorney.

No. 647,276.  
G. C. PYLE.  
MACHINE FOR MAKING HOLLOW GLASSWARE.  
(Application filed Feb. 25, 1899.)  
(No Model.)  
Patented Apr. 10, 1900.  
6 Sheets—Sheet 3.

Witnesses  
R. D. Hawkins  
M. C. Buck

Inventor  
George C. Pyle  
By V. H. Lockwood  
His Attorney.

No. 647,276. Patented Apr. 10, 1900.
G. C. PYLE.
MACHINE FOR MAKING HOLLOW GLASSWARE.
(Application filed Feb. 25, 1899.)
(No Model.) 6 Sheets—Sheet 4.
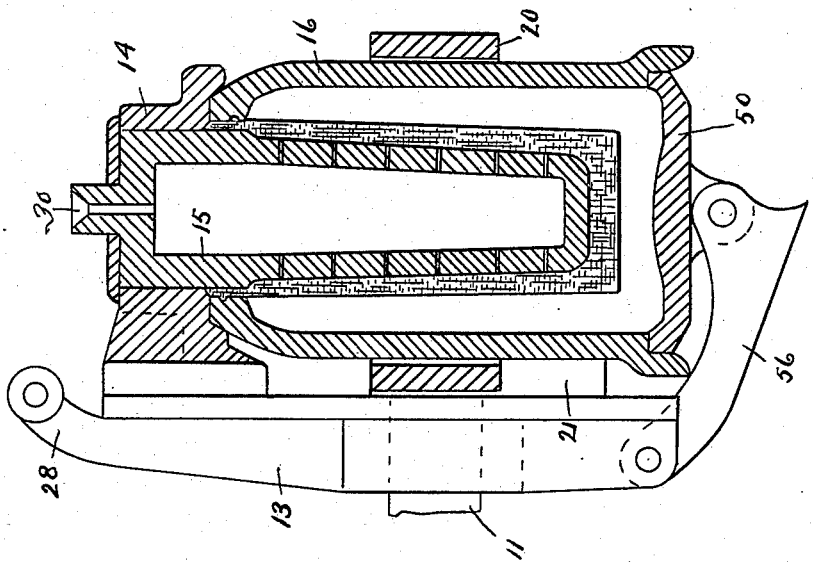
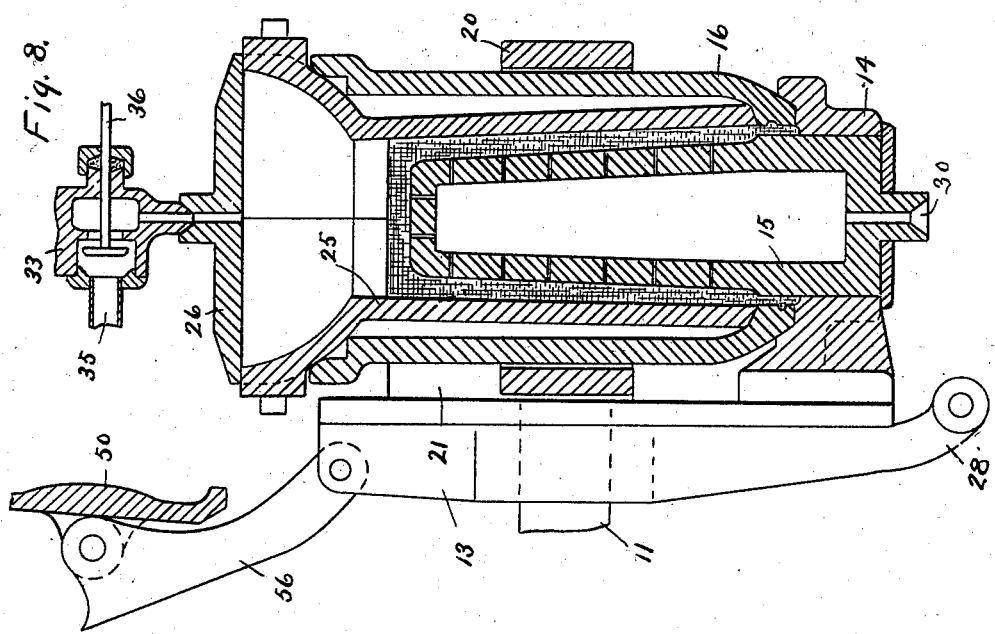
Witnesses
R. D. Hawkins
M. C. Buck.
Inventor
George C. Pyle
By V. H. Lockwood Jr.
His Attorney.
THE NORRIS PETERS CO., PHOTO-LITHO., WASHINGTON, D. C.

No. 647,276. Patented Apr. 10, 1900.
G. C. PYLE.
MACHINE FOR MAKING HOLLOW GLASSWARE.
(Application filed Feb. 25, 1899.)
(No Model.) 6 Sheets—Sheet 5.
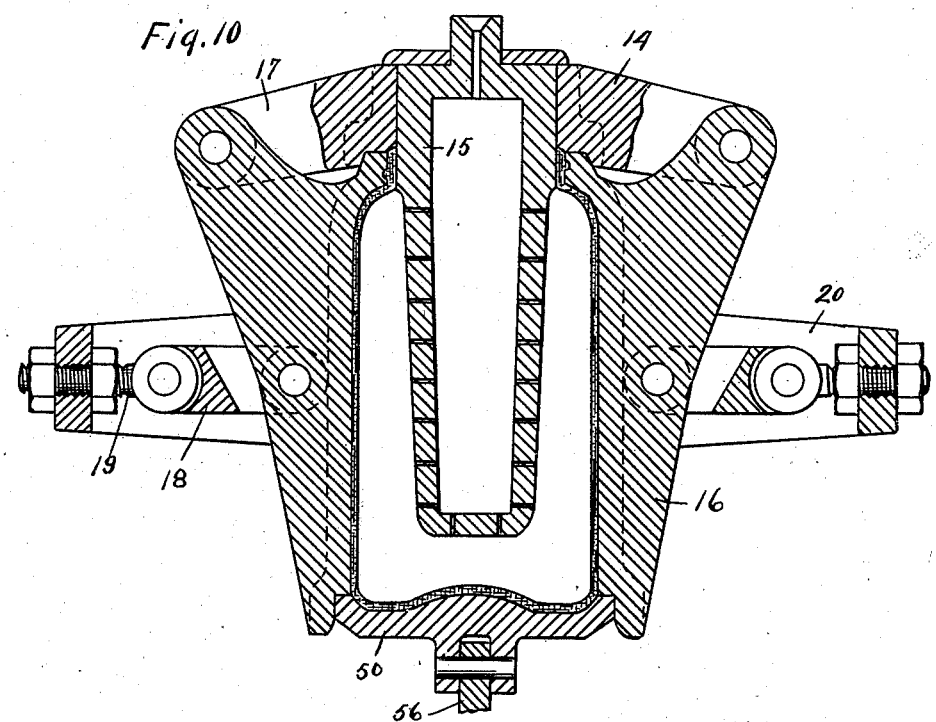
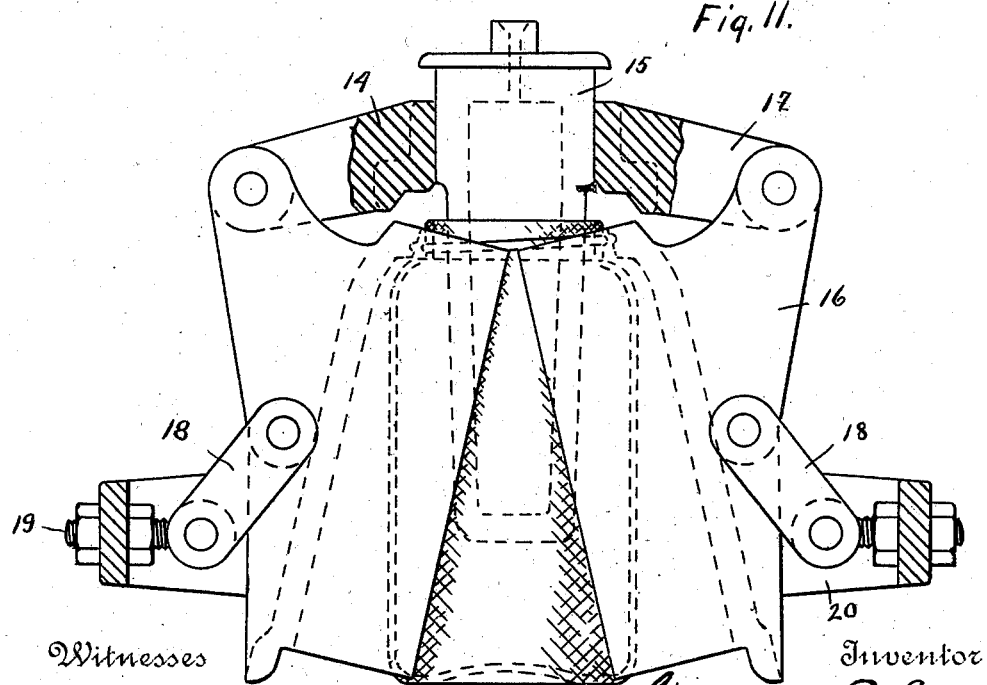
Witnesses
R. D. Hawkins
M. C. Buck.
Inventor
George C. Pyle
By H. Lockwood
His Attorney.

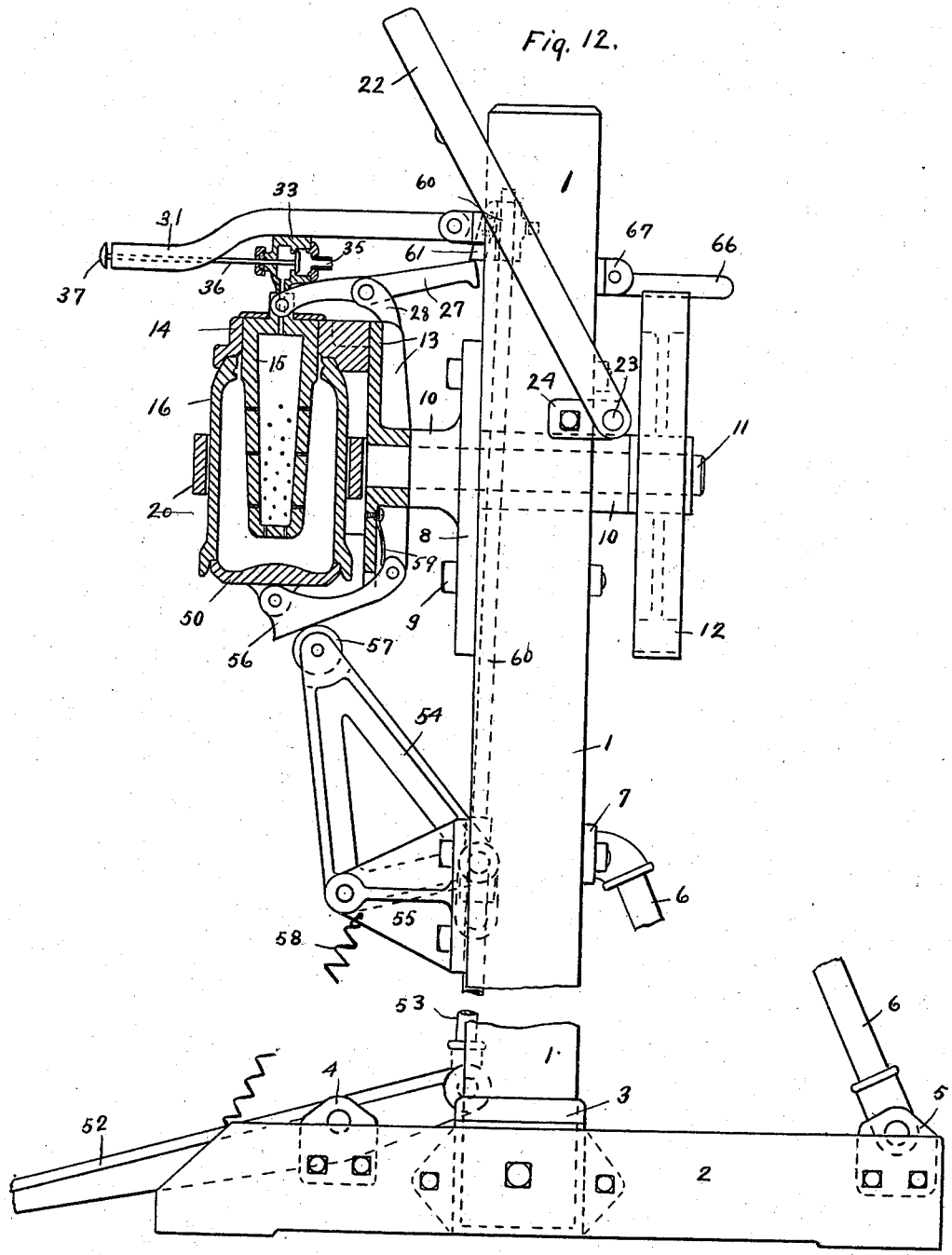

UNITED STATES PATENT OFFICE.

GEORGE C. PYLE, OF INDIANAPOLIS, INDIANA.

MACHINE FOR MAKING HOLLOW GLASSWARE.

SPECIFICATION forming part of Letters Patent No. 647,276, dated April 10, 1900.

Application filed February 25, 1899. Serial No. 706,845. (No model.)

*To all whom it may concern:*

Be it known that I, GEORGE C. PYLE, of Indianapolis, county of Marion, and State of Indiana, have invented a certain new and useful Machine for Making Glass Jars; and I do hereby declare that the following is a full, clear, and exact description thereof, reference being had to the accompanying drawings, in which like figures refer to like parts.

This machine is for making glass jars, bottles, and other similar glassware wherein the article is formed by the use of compressed air and completely finished without removing the glass after it is dropped into the mold.

The various features of the invention will appear from the accompanying drawings and the description and claims following.

Figure 1:
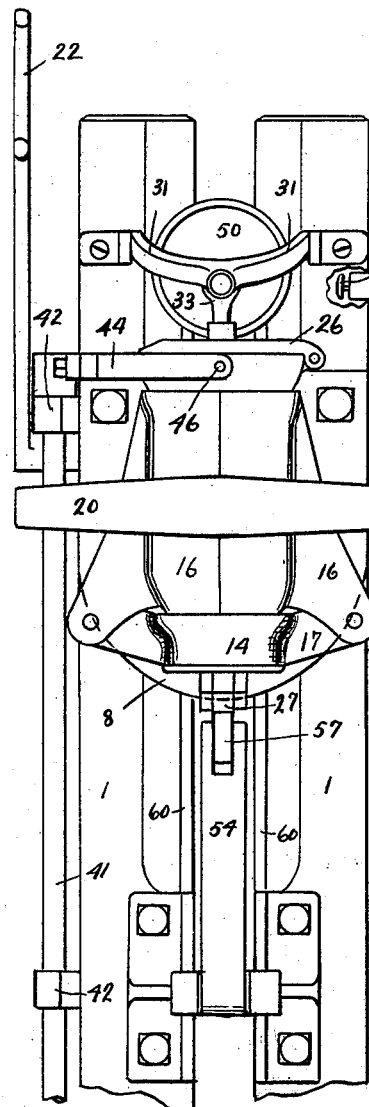
Figure 2:
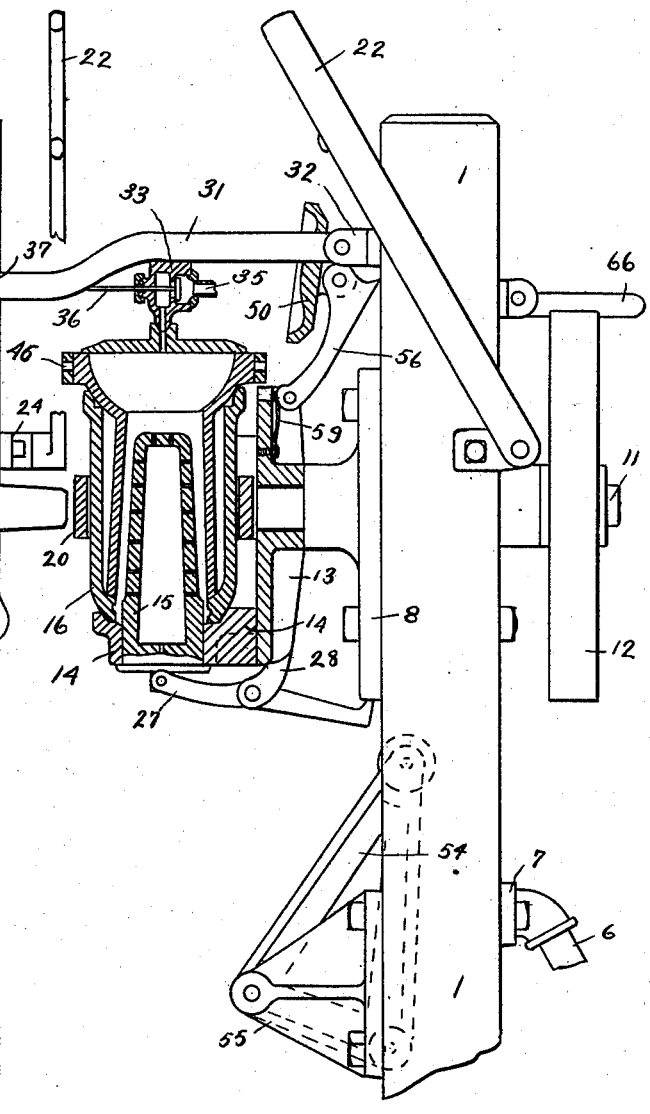
Figure 6:
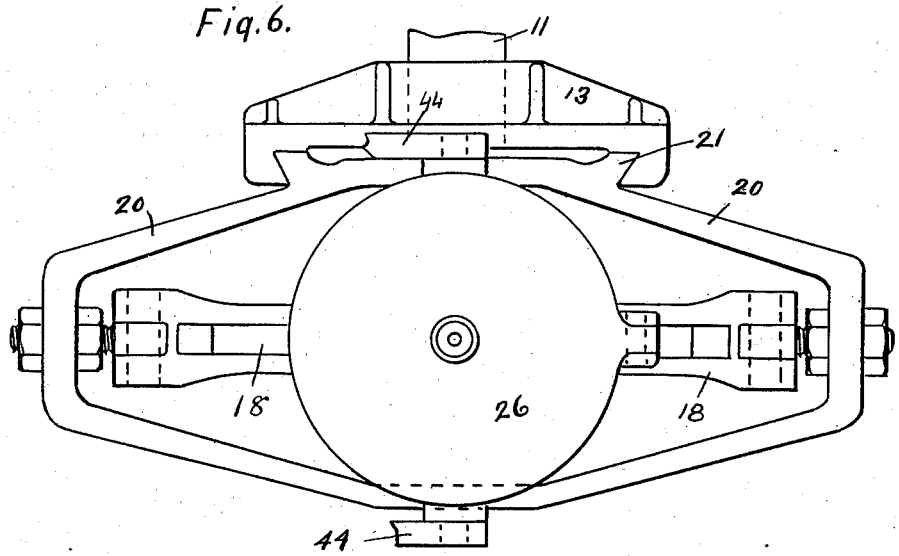
Figure 7:
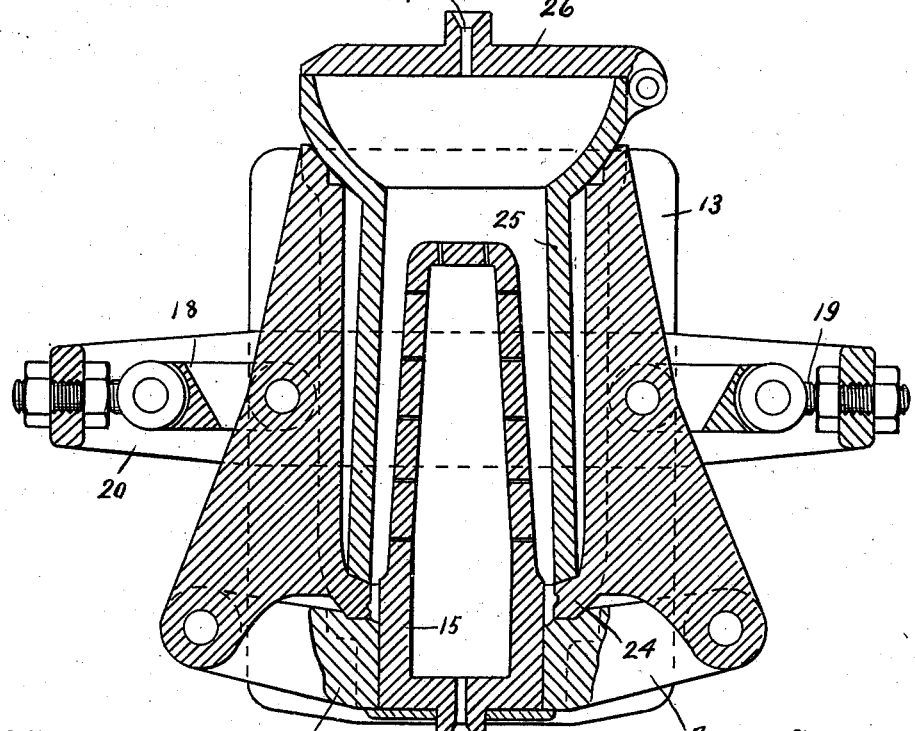

In the drawings, Figure 1 is a front elevation of the machine with the lower portion broken away. Fig. 2 is a side elevation of the same with the mold and coöperating parts in vertical central section. Fig. 3 is a rear elevation of the machine, the lower part being broken away. Fig. 4 is a plan thereof. Fig. 5 is a detail in plan of the pedal construction, the pedals being partly broken away and the uprights of the frame in section. Fig. 6 is a plan of the mold and coöperating parts in position for the performance of the first part of the operation. Fig. 7 is a central vertical cross-section of the same. Fig. 8 is a central vertical section from front to rear of the mold and coöperating parts with the glass therein as at the completion of the first part of the operation. Fig. 9 is the same with the mold and coöperating parts inverted and before the second step of the operation is commenced. Fig. 10 is a central vertical cross-section of the mold and some of the coacting parts with the glass article finished. Fig. 11 is a front elevation of the same, showing the mold spread for the discharge of the finished article. Fig. 12 is a side elevation of the machine with the parts in position for the performance of the second step of the operation, the framework being broken away near the lower end and the mold and coöperating parts being in vertical central cross-section.

A frame is formed of two upright pieces 1 and base-pieces 2, secured together at the bottom, as shown in Figs. 5 and 12. As seen in said figures, the base-pieces 2 are secured to the uprights by the metal angle-irons 3. The said base-pieces are held in place relatively to each other by a cross-bar 4, and the rear portion thereof has a similar cross-bar 5, from which a brace 6 extends upwardly to the cross-bar 7, that extends from one upright to the other. Toward the upper end of said uprights a plate 8 is secured to both uprights by the bolts 9, having formed integrally therewith the bearing 10, that extends horizontally through between the uprights. In this bearing there is mounted a shaft 11, carrying on one end a wheel 12 for actuating it and on the other a face-plate 13. Said face-plate has extending from one end a bracket 14, as seen in its lower position in Fig. 2 and in its upper position in Fig. 12, after the said face-plate has been rotated. Said bracket 14 has an opening through it, as seen in said figures, for the former 15 and is dished or cut out around said opening to receive the lower end of the mold 16, as seen in Fig. 2. The mold 16 is formed of two parts, as seen in Figs. 7, 14, and 15, hinged at one end to the arms 17, that extend in opposite directions from the bracket 14, as is to be seen best in Figs. 7, 10, and 11. The said halves of the molds are wider at their hinged end than at the other end, making it somewhat conical in form, as is to be seen in the figures last above referred to. To a point near the middle of said parts of the mold 16 I pivot the links 18. Said links at their other end are pivoted to the bolts 19, adjustably mounted in the ends of the movable yoke 20, as is to be seen in Figs. 6 and 7. By reference to Figs. 6, 7, 10, and 11 it is clear that when said yoke, with the pivoted connection with the parts of the mold, is moved upward from the position shown in Fig. 7 the parts of the mold will be separated, and when it is moved downward into the position shown in said figure they will be closed. Also when the mold is inverted, as shown in Figs. 10 and 11, if said yoke be depressed from the position shown in Fig. 10 to that shown in Fig. 11 the parts of the mold will be open, or when moved from the position shown in Fig. 11 upward into the position shown in Fig. 10 the parts of the mold will be closed. The said yoke 20 is guided in its vertical movement by the means shown in Fig. 6, there being a flaring extension 21, that fits in a corresponding guideway in the face of the plate 13. The said yoke is moved in operation by the two levers 22, (to be seen in Figs. 2 and 4,) that are mounted rigidly on the shaft 23, carried in arms secured to the uprights 1, so that the shaft 23 is in the rear of said uprights. The only movement of said yoke 20 that is necessary in the operation of this machine is the downward movement, which is effected by throwing down said levers 22 from the position shown in Figs. 1, 2, 3, and 4, whereby said levers engage the ends of the yoke, resting upon the same, as will be clear from an inspection of Fig. 1.

The mold 16 and a portion of the surface of the bracket 14 are so formed as to form the outer surface of the neck of the glass article, as is to be seen in Figs. 7 to 10, inclusive. To that end said mold has an annular extension 24. The inner surface of the neck of the article is formed by the stationary former 15. The body of the article I form only partially, while the neck is being formed, preferably, by the use of a false or inner mold 25, coöperating with said stationary former 15. Said false or inner mold, however, is not necessary for this purpose where the diameter of the body of the article is less than that of the neck, for then no spreading of the body is necessary; but where the body is larger than the neck, as is true of the glass article shown in Fig. 10, said false or inner mold is quite desirable. This false or inner mold consists of an upper funnel-shaped portion, into which the glass is initially dropped, and of an annular extension that extends downward into the mold between the mold proper and around the stationary former 15, as appears clearly in Fig. 7. A lid 26 is hinged to the upper end of said false or inner mold, as shown in the same figure, and is suitably perforated for the introduction of compressed air after the lid is closed. Said false or inner mold may be in one piece; but, as shown here, it consists of two parts or halves. By reason of the circular form of the upper end of the outer mold and of the funnel-shaped upper end of the false or inner mold the latter will readily and accurately center itself.

The former 15, as has heretofore been stated, is stationary during the entire operation. It is supported in place by the lever 27, which is centrally pivoted to the arm 28, extending from the plate 13, as appears in Fig. 2. The other end of the lever 27 engages the rounded under surface or edge of the plate 8 when in the position shown in Figs. 1 and 2. As is to be seen in Fig. 1, the under edge of said plate 8 is curved. The molds and all parts mounted on the plate 13 are rotatable by means of the wheel 12, and when these parts are turned in the position shown in Fig. 2 it is obvious that the end of the lever 27 which engages the rounded under surface of the plate 8 will tend to hold the former 15 tightly in place. Said former has an inlet at 30 for the admission of air in blowing the glass article in the second step of the operation, said inlet appearing in Figs. 8, 9, and 12. As has been heretofore stated, this former is hollow and the body of it perforated for the purpose of blowing the body of the glass article after the parts are put into the position shown in Figs. 9, 10, and 12. The body of said former is preferably slightly tapering, as shown, in order only partly to form the body of the glass article during the first step of the operation.

Any suitable means for introducing compressed air into the mold or into the former 15 may be employed. I here show a hand-lever 31, pivoted to a bracket 32, which is fastened on the frame. To the said lever about centrally, as shown, I mount an air-valve 33, with the outlet 34 therefrom through the lower end, which is conical in shape, to fit into the funnel-shaped opening through the lid 26, as seen in Fig. 7, and the opening 30 in the former. Said valve is supplied with compressed air through the pipe 35, extending from any suitable source of supply. For opening and closing said valve I employ a stem 36, with the finger-piece 37 on its outer end, near the end of the lever.

When the parts which have heretofore been described are in the position shown in Fig. 2 and before the lid 26 is closed, the glass is dropped into the funnel-shaped opening at the upper end of the false or inner mold. Then the lid 26 is closed, the lever 31 drawn down, with the compressed-air valve entering the opening through said lid, and said valve operated, whereby compressed air is introduced into said false or inner mold. The air forces the glass into the mold into the position shown in Fig. 8, thus forming the neck of the article and partly forming the body thereof. Then the lever 31 is thrown upward out of the way and the false or inner mold withdrawn by the following pedal-actuating mechanism: The pedal 40 is fulcrumed on the cross-bar 4, so as to actuate vertically the rod 41, which is mounted in the brackets 42, as appears in Figs. 1, 4, and 5. To the upper end of said rod 41, as appears in Fig. 4, I rigidly secure one end of a horizontal arm 43. The other end of said arm is rigidly secured to a bail-shaped arm 44, which supports the two halves or parts of the false or inner mold, as appears in Figs. 1, 2, and 4, the upper end of said former being provided with pin-holes 45 to receive the pins 46. The operation of the pedal will by the means just described lift the false or inner mold straight up out of the mold 16. After the said false or inner mold has been removed the mold 16, with the partly-formed glass article in it, is inverted by means of the hand-wheel 12, which rotates the face-plate 13, on which all these parts are mounted. The mold 16 and coacting parts are then changed from the position shown in Fig. 2 to that shown in Fig. 12 or from that shown in Fig. 8 to that shown in Fig. 9. The bottom of the mold 16 is then closed by bringing the bottom piece 50 into the position shown in Fig. 9. The lower end of the mold is provided with a suitable seat to receive said bottom piece and make a tight joint. This bottom piece is brought into position by the actuation of the pedal-piece 52, which is fulcrumed on the bar 4, as seen in Fig. 12, and through the rod 53 engages the inner corner of the bell-crank 54 and actuates it. Said bell-crank is mounted in the outer end of the brackets 55. In its unoperated position the upper end of said bell-crank extends between the two uprights, as seen in Fig. 2. During the first step of the process the bottom piece 50, which is carried by the support 56, that is pivoted to the face-plate 13, is in the position shown in Fig. 2—that is, in the upper part of the machine. When the mold is inverted, said face-plate 13 being rotated half the way around, the bottom piece 50 and its supporting-link 56 hang downward in the path of the upper end of the bell-crank 54. When said bell-crank is actuated, it moves outward from the frame and engages the link 56 and pushes the bottom piece automatically into place, as is to be seen in Fig. 12. The dimensions of the bell-crank and the form of the link 56 are such that the bottom will be snugly brought into place upon the actuation of the bell-crank, as shown. In the upper end of the bell-crank I mount a friction-roller 57 to engage the link 56. The bottom piece is held tightly in the position shown in Fig. 12 by retaining the foot on the pedal 52. When the foot is removed, a spiral spring 58, which is connected with the pedal at one end and with the bracket 55 at the other, depresses the rod 53, which permits the bell-crank to return to its inoperative position. (Shown in Fig. 2.) While the mold is in the position shown in Fig. 2 a flat spring 59 on the back of the face-plate 13 engages the link 56 to hold it and the bottom piece 50 out of the way, as shown in said Fig. 2. While the bottom piece is held in place with the foot on the pedal the body of the bottle is blown by bringing down the lever 31, which carries the air-valve, so that said valve enters the opening 30 in the former. Then upon the admission of air into said former the body of the bottle will be blown from the form shown in Fig. 9 to that shown in Fig. 10, which finishes the bottle. After the release of the pedal 52, permitting the return of the bell-crank 54, the bottom piece 50 drops down and backward out of the way toward the frame. The inner end of the bell-crank upon the return movement of the bell-crank depresses the rod 60. (Shown in dotted lines in Fig. 12.) The upper end of said rod carries a spring-pressed pawl 61, pivoted to rod 60 and having an inclined face, as shown, so that when said rod 60 is elevated from the first actuation of the bell-crank the trigger or pawl 61 will pass by the inner end of the lever 27, that supports the former 15. When, however, the article has been finished and the bell-crank returns to its inoperative position and said rod 60 is depressed, as has been described, the pawl 61, being in the position shown in Fig. 12, will actuate the lever 27 to a limited extent, sufficiently far to elevate the former 15 enough to disengage the neck of the article, as appears in Fig. 11. The bottom now being out of the way and the neck of the article being now disengaged by the former, the levers 22 are thrown down on the yoke 20 to move it from the position shown in Fig. 10 to the position shown in Fig. 11, which by reason of the links 18 will cause the opening of the mold 16. The glass article, therefore, being wholly disengaged from the former and the mold, drops out. By means of the actuation of the wheel 12 the molds are then reversed and placed in the original position. (Shown in Fig. 2.)

In order that the molds in either position may be vertical, I provide notches 65 in the periphery of the hand-wheel 12, as is shown in Fig. 3, on opposite sides thereof. These notches are engaged by the gravity-pawl 66, pivoted to the cross-piece 67. When the hand-wheel is to be actuated, the pawl 66 must be disengaged, and during the performance of the parts of the operation it will hold the wheel, and therefore the molds, in the proper position.

What I claim as my invention, and desire to secure by Letters Patent, is—

1. In a machine for making hollow glassware, a frame, a mold mounted vertically in said frame, means at the lower end for shaping the neck of the article, a former extending into the mold through the lower end, a lid for closing the upper end of the mold with a conduit therethrough, a hand-lever pivoted to the framework above the mold, a valve mounted thereon so its outlet will register with the conduit in the lid when the lever is lowered, a tube for conveying compressed air to the valve, and a stem attached to the handle for operating said valve.

2. In a machine for making hollow glassware, a mold formed of two longitudinally-extending parts pivoted at one end, a frame or yoke movable in a line parallel with the length of the mold, and links pivotally connecting said frame or yoke and the parts of the mold, whereby when said frame or yoke is moved the mold will be either opened or closed.

3. In a machine for making hollow glassware, a face-plate with a guideway therein, a bracket extending from said face-plate, a mold composed of two parts hinged at one end to said bracket, a frame or yoke whose length is greater than the width of the mold vertically slidable in the guideway in said face-plate, and links connecting the ends of the frame or yoke with the parts of the mold, whereby when said frame is elevated the mold will be opened or closed.

4. In a machine for making hollow glassware, a frame for the machine, a bracket carried by said frame, a mold formed of two longitudinally-extending parts with each part at one end pivoted to said bracket, a movable frame or yoke whose length is greater than the width of the mold, links pivotally connecting the ends of said movable frame or yoke with each part of the mold, and a lever pivotally mounted at one end to the frame of the machine and adapted when operated to move said movable frame or yoke.

5. A machine for making hollow glassware, a machine-frame, a bracket so mounted on said frame as to be vertically revoluble, a mold formed of two longitudinally-extending parts with one end of each part hinged to said bracket, a movable frame or yoke whose length is greater than the width of said mold, links pivotally connecting the ends of said movable frame or yoke with each part of the mold, and a pair of levers pivoted at one end to the frame of the machine and adapted when turned down to engage and depress said movable frame, whereby when the mold is in one position such depression of the movable frame or yoke will close the mold and when in the reverse position it will open the mold.

6. In a machine for making hollow glassware, a face-plate rotatably mounted in the frame with an arm extending therefrom, a mold carried by said face-plate, a former extending into the mold, a lever mounted in said arm with one end supporting said former, and a plate secured to the frame with its upper face curved and so located as to engage the lever supporting the former when the mold is being rotated to force and hold said former tightly in position.

7. In a machine for making hollow glassware, a rotatable face-plate, a mold carried by the same with its bottom open, a bottom piece for closing said mold, a link pivoted at one end to said bottom piece and at the other to the face-plate, and a spring on the face-plate that holds said link and bottom piece backward out of the way when in their upper position.

8. In a machine for making hollow glassware, a frame, a mold carried by the frame with its lower end open, a bottom piece for closing said mold, a link pivotally connected at one end to said bottom piece and at the other end to the frame, a bell-crank lever mounted in the frame so that one end when operated will engage said link and force and hold the bottom piece into position for closing the mold, and a pedal for actuating said bell-crank lever.

9. In a machine for making hollow glassware, a frame, a mold carried by the frame with its lower end open, a bottom piece for closing said mold, a link pivotally connected at one end to said bottom piece and at the other end to the frame, a bell-crank lever mounted in the frame so that one end when operated will engage said link and force and hold the bottom piece into position for closing the mold, a pedal for actuating said bell-crank lever, and a spring for causing the withdrawal of said bell-crank lever when the pedal is released.

10. In a machine for making hollow glassware, a frame, a mold carried thereby, a hollow perforated former extending into the mold through its upper end, a centrally-fulcrumed lever with one end pivoted to said former, a vertically-movable rod mounted in the framework, and a trigger or pawl pivoted to said rod and adapted to engage the free end of said lever whereby when said rod is depressed the former will be elevated.

11. In a machine for making hollow glassware, a frame, a mold carried thereby which is open at both ends, a bottom piece for closing the lower end, a link pivoted to said bottom piece and to the frame, a bell-crank adapted when operated to engage said link and force and hold the bottom piece into place for closing the mold, a pedal for operating said bell-crank, a former extending into the mold through its upper end, a lever centrally fulcrumed with one end pivoted to the upper end of the former, a vertically-movable rod mounted in said framework with the lower end actuated by the movement of said bell-crank, a trigger or pawl in the other end of the rod so mounted that in its downward movement it will engage the said lever connected with the former and in its upward movement will pass by said lever.

12. In a machine for making hollow glassware, a frame, an outer mold carried thereby, an inner mold extending downward into said outer mold, a bail-shaped arm pivoted to the upper end of said inner mold, a vertically-movable rod in the framework for elevating said bail-shaped arm, and a pedal for vertically moving said rod.

In witness whereof I have hereunto affixed my signature in the presence of the witnesses herein named.

GEORGE C. PYLE.

Witnesses:
JULIUS KARRMANN,
V. H. LOCKWOOD.